Nov. 1, 1927.
F. L. HAGUE
1,647,351
WEIGHING SCALE AIR VENT
Filed June 12, 1924
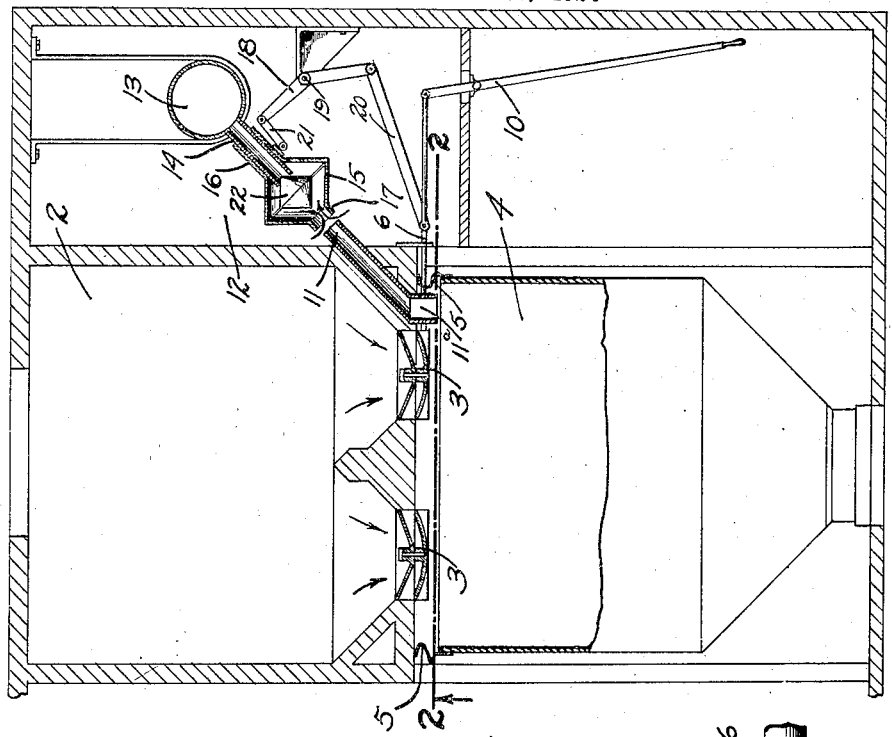
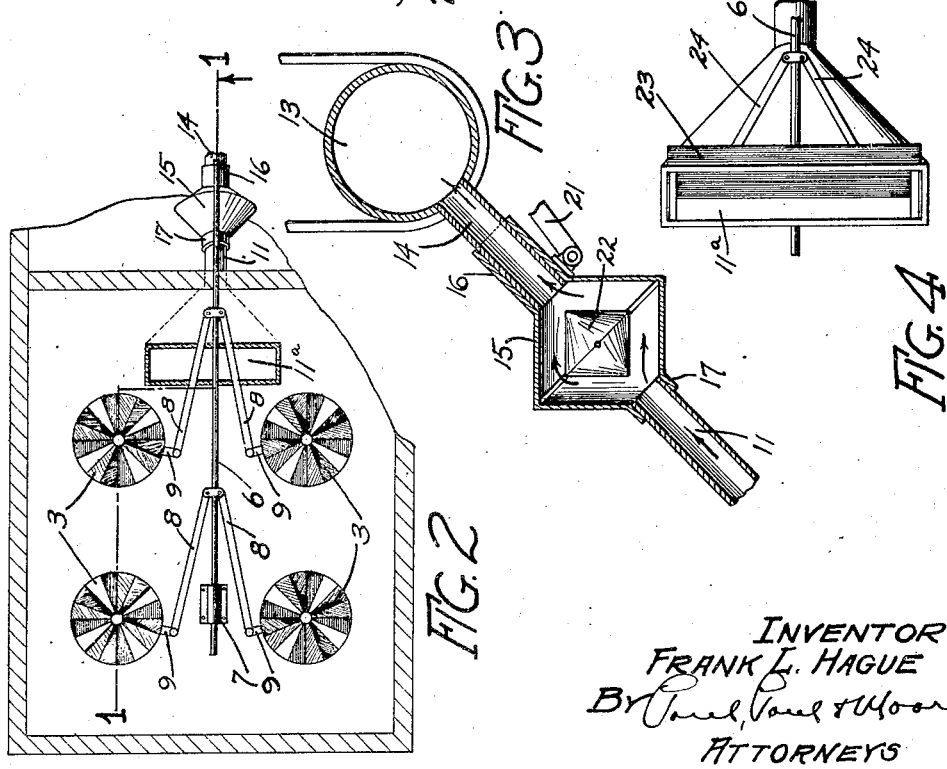
INVENTOR
FRANK L. HAGUE
BY
ATTORNEYS Patented Nov. 1, 1927.

1,647,351

UNITED STATES PATENT OFFICE.

FRANK L. HAGUE, OF MINNEAPOLIS, MINNESOTA, ASSIGNOR TO FEAGLES CONSTRUCTION COMPANY, LTD., OF MINNEAPOLIS, MINNESOTA, A CORPORATION OF CANADA.

WEIGHING-SCALE AIR VENT.

Application filed June 12, 1924. Serial No. 719,578.

In the operation of a weighing scale where material such as grain is delivered from a garner or other suitable receptacle into a scale hopper, provision should be made for venting or collecting the air from the scale hopper to prevent the formation of a pressure therein and consequent retarding of the flow of the grain to the scale hopper. The vents commonly employed exhaust into the garner above where the scale is located and are objectionable as a considerable quantity of dust may be discharged with the air.

The object of my invention is to provide an apparatus by means of which air pressure in the scale hopper may be prevented and the dust-laden air which may collect in the scale hopper may be driven to a suitable suction trunk for discharge at a distant point.

A further object is to provide an air venting device that is operated positively through the control mechanism of the valves leading to the hopper to the end that the valves cannot be opened or closed without a corresponding movement of the control for the air vent, thus the operation of the vent is insured and the discontinuance or cut-off of the suction is also insured during the weighing operation.

The invention consists generally in various constructions and combinations all as hereinafter described and particularly pointed out in the claims.

In the accompanying drawings forming part of this specification,

Figure 1 is a vertical sectional view through a garner and valve control therefor, a portion of the wall of the scale hopper being broken away to show the connection of the air vent therewith;

Figure 2 is a sectional view on the line 2—2 of Figure 1;

Figure 3 is a detail sectional view showing the connection of the scale hopper chamber with the suction trunk;

Figure 4 is a detail view of a modified construction.

In the drawing, 2 represents a garner adapted to receive a quantity of grain or similar material and having in its bottom a series of valves 3 by means of which the flow of grain or similar material from the garner into the scale hopper chamber 4 beneath is controlled. The top of the scale hopper has preferably a flexible apron 5 between it and the bottom of the garner for the purpose of closing the gap between them and forming, when the valves are open, a continuous chamber. The valves are simultaneously operated by suitable means such as a rod 6 slidable in a guide 7 at one end and having links 8 arranged in pairs pivotally connecting said rod with cranks 9 for operating the valves to open or close the ports therethrough. The rod 6 projects outside the walls of the garner and hopper and is pivotally connected to the upper end of an operating lever 10 that is within convenient reach of an attendant, and by means of which the opening or closing of all of the valves will be effected simultaneously. When these valves are opened, it is evident that the grain will flow by gravity down into the scale hopper beneath and unless some venting device is provided a considerable air displacement will develop. To properly vent this air and any dust or fine foreign material that may be suspended therein, I provide a spout 11, having an enlarged intake opening $11^a$, mounted in the lower wall of the garner and depending to a point near the top of the scale hopper adjacent a pair of the valves. This spout projects into a chamber 12 wherein a suction air trunk 13 is suspended and provided with a pipe section 14. 15 represents a housing having a sleeve 16 at one end which slides on the pipe section 14 and provided with a collar 17 at its other end that is adapted to telescope with the upper end of the spout 11. A lever 18 is pivoted at 19 and has a link 20 connecting its lower end with the rod 6, and the upper end of said lever has a link 21 pivotally connecting it with the sleeve 16 so that when the rod 6 is reciprocated to open and close the valves, a corresponding movement will be imparted to the sleeve 16 and the housing 15. A valve 22 preferably in the form of a double-ended cone is mounted in the housing 15 and has a tapered wall to enter the pipe section 14 and normally cut off the flow of air into said section and the suction pipe. When the valve is in this position, the collar 17 will be disengaged from the spout 11 leaving a gap between them and this gap will of course break the suction and prevent the possibility of air being drawn from the hopper chamber or a suction being established therein which would interfere or render inaccurate the weighing operation. The gap between the collar 17 and the pipe section 11 will be visible to the operator or to an ordinary observer, indicating without question, that when the valve 22 is moved to its closed position to break the suction in the spout leading to the suction trunk, it will entirely prevent any suction in the hopper chamber that would affect the accuracy of the weighing.

When the valves leading from the garner are opened to discharge grain or other material into the hopper, the break in the suction pipe will be closed and sufficient suction will be set up in the hopper chamber to remove the air and dust and prevent the generation of air pressure through the discharge of the material from the garner into the hopper. The positive break which I provide in the suction pipe during the weighing operation is for the purpose of convincing any skeptical person that the suction is entirely destroyed or cut off during such operation.

In Figure 4, I have shown a modified construction which consists in providing a slide valve 23 having links 24 connecting it with the operating rod 6, the valve being mounted in the intake opening 11ª of the spout 11 and serving to close the passage therethrough and prevent the flow of air from the scale hopper to the suction trunk. This valve will be positively closed when the garner valves are closed as it is connected with and operated by the lever mechanism which controls the movement of the garner valve.

I claim as my invention:

1. In combination with a garner having a discharge port and a valve therefor, and a scale hopper whereto the material is delivered through the port, a vent pipe communicating with the hopper, a main suction pipe, a pipe section translatable to alternately establish and break communication between one of the first mentioned pipes, and means connecting the hopper valve and translatable pipe section to move said pipe section and establish suction connection as the valve is open, and to break such connections as the valve is closed.

2. In combination with a garner having a discharge port and a valve therefor, and a scale hopper whereto the material is delivered through the port, a vent pipe communicating with the hopper, a main suction pipe, a pipe section translatable to alternately establish and break communication between the first mentioned pipes, and means connecting the hopper valve and translatable pipe section to move said pipe section and establish suction connection as the valve is open and to break such connections as the valve is closed, the arrangement being such that a gap is formed between the ends of two of the pipe sections, when the valve is closed, this gap being visible to the operator.

3. The combination with a garner having discharge ports and valves therefor and a scale hopper whereto the material is delivered, of a suction spout communicating with said scale hopper for venting the air therein, a valve for said spout and mechanism for simultaneously operating said garner and spout valves.

4. The combination with a scale hopper and means for delivering the material to be weighed thereto, of a spout communicating with said hopper for venting the air and dust therein, a suction connection for said spout, means for cutting off said suction connection, and said spout being adapted for separation to provide a gap in its walls to positively prevent suction in said scale hopper during the weighing operation.

5. The combination with a scale hopper and a valve for controlling delivery of material thereto, of an air vent leading from said hopper, a closing means for said vent, and means for operating said valve to deliver material to said hopper and simultaneously open said vent to exhaust the air pressure from said hopper.

6. The combination with a scale hopper and a valve for controlling the delivery of material thereto, of an air vent leading from said hopper, a closing means for said vent, an operating means for said valve, and means whereby the closing of said valve will simultaneously close said vent before the weighing operation.

7. The combination with a scale hopper and means for delivering material to be weighed thereto, of means for creating a suction in said hopper to prevent air pressure therein, and means whereby said suction is positively broken when said delivering means is closed.

8. The combination with a scale hopper and means for delivering material to be weighed thereto, of means for removing the dust-laden air while the hopper is being filled, and means for checking such removal before the weighing operation.

9. A method of weighing material which consists in delivering it to a closed scale hopper, removing the dust-laden air during such delivery, and positively checking such delivery before the weighing operation.

In witness whereof, I have hereunto set my hand this 10th day of June, 1924.

FRANK L. HAGUE.

CERTIFICATE OF CORRECTION.

Patent No. 1,647,351.                                 Granted November 1, 1927, to

FRANK L. HAGUE.

It is hereby certified that the name of the assignee in the above numbered patent was erroneously written and printed as "Feagles Construction Company, Ltd." whereas said name should have been written and printed as "Fegles Construction Company, Ltd.", as shown by the records of assignments in this office; and that the said Letters Patent should be read with this correction therein that the same may conform to the record of the case in the Patent Office.

Signed and sealed this 6th day of December, A. D. 1927.

Seal.

M. J. Moore,
Acting Commissioner of Patents.